United States Patent [19]

Goldstein et al.

[11] Patent Number: 5,595,949
[45] Date of Patent: Jan. 21, 1997

[54] SCRUBBER SYSTEM FOR REMOVING CARBON DIOXIDE FROM A METAL-AIR OR FUEL CELL BATTERY

[75] Inventors: Jonathan R. Goldstein; Yehuda Harats; Yuval Sharon; Neal Naimer, all of Jerusalem, Israel

[73] Assignee: Electric Fuel (E.F.L.) Ltd., Jerusalem, Israel

[21] Appl. No.: 210,333

[22] Filed: Mar. 18, 1994

[51] Int. Cl.$^6$ .................................................. B01J 20/34
[52] U.S. Cl. ........................... 502/20; 423/220; 423/230; 95/148
[58] Field of Search .......................... 422/211; 423/220, 423/230; 502/20, 402; 95/148

[56] References Cited

U.S. PATENT DOCUMENTS

| | | | |
|---|---|---|---|
| 3,830,632 | 8/1974 | Guzay | 128/191 |
| 3,909,206 | 9/1975 | Katz. | |
| 3,990,912 | 11/1976 | Katz. | |
| 4,047,894 | 9/1977 | Kuhl. | |

FOREIGN PATENT DOCUMENTS

| | | |
|---|---|---|
| 0201468 | 4/1986 | European Pat. Off. . |
| 1583419 | 10/1969 | France . |
| 2230396 | 12/1974 | France . |
| 2290239 | 6/1976 | France . |
| 60-035470 | 2/1985 | Japan . |
| 63-241877 | 10/1988 | Japan . |
| 2030886 | 4/1980 | United Kingdom . |
| 84/02283 | 6/1984 | WIPO . |

*Primary Examiner*—Michael Lewis
*Assistant Examiner*—Thomas G. Dunn, Jr.

[57] ABSTRACT

A method for maximizing the effective life and utilization of $CO_2$-absorbent material in a scrubber system for removing carbon dioxide from an air inflow to a metal-air battery or fuel cell comprises providing, in such a battery, a housing including a gas inlet, a gas outlet, and at least one removable, gas-permeable container containing a $CO_2$-absorbent material, the container being positioned across the flow path of gas entering said inlet and exiting said outlet. After a predetermined utilization of the system, the at least one removable, gas-permeable container is removed therefrom and spent $CO_2$-absorbent material from the container is regenerated for reuse in the scrubber system, the regeneration including at least periodically removing accumulated Group 1a metal carbonate deposits.

11 Claims, 2 Drawing Sheets

SCRUBBER SYSTEM FOR REMOVING CARBON DIOXIDE FROM A METAL-AIR OR FUEL CELL BATTERY

BACKGROUND AND SUMMARY OF THE INVENTION

The present invention relates to a scrubber system for removing carbon dioxide from a metal-air or fuel cell battery.

More particularly, the present invention relates to such a scrubber system and to a method for maximizing the effective life and utilization of carbon dioxide-absorbent material in such a scrubber system.

As is known, and as described, e.g., in U.S. Pat. No. 3,909,206, alkali electrolyte fuel cells and metal-air batteries require a clean fuel and a clean oxidant to generate power. Many oxidants, such as air and all but the most pure, and therefore the most expensive, oxygen supplies and some fuels contain carbon dioxide ($CO_2$) which, when brought into contact with the electrolyte, combine with the electrolyte to form carbonates. The formation and presence of carbonates in the electrolyte decreases the voltage of the cells and batteries, and eventually causes their failure.

For this reason, a $CO_2$ scrubber system is applicable to a metal-air or fuel cell battery (e.g., zinc-air battery, hydrogen-air fuel cell) with an alkaline electrolyte (e.g., aqueous KOH) and incorporating an air electrode, supplied with air as the cathodic reactant. Regular air contains about 400 ppm of $CO_2$, and if this $CO_2$ is not removed, the $CO_2$ can react with the KOH to form potassium carbonate ($K_2CO_3$), which will gradually build up in the alkaline electrolyte.

$$2KOH + CO_2 = K_2CO_3 + H_2O \tag{1}$$

$K_2CO_3$ not only reduces the conductivity and alkalinity of the KOH, giving poorer cell polarization characteristics, but, being less soluble than KOH, can deposit carbonate crystals in the pores of the air electrode, especially in the presence of other sparingly soluble ions, such as zincates and aluminates in the electrolytes of zinc-air and aluminum-air cells respectively. These crystals can cause leaks and shorten the life of air electrodes.

The general absorption reaction of $CO_2$ by alkali metal hydroxide (MOH) may be written:

$$2MOH + CO_2 = M_2CO_3 + H_2O \tag{2}$$

The prior art has therefore suggested the use of a scrubber system containing alkali hydroxide granules, held as a compact bed in a suitable container whose dimensions, the granule size, the granule loading and degree of packing of the granules are determined by such factors as the required air flow rate and flow time through to the battery, permitted pressure drop across the granule bed, permitted $CO_2$ exit concentration and degree of absorption required within the bed. Advantageously, the granules are retained between plastic screens somewhat finer than the granule dimensions. When the bed is no longer effective for scrubbing and $CO_2$ breakthrough occurs, as shown, for example, visually (by a color change of a chemical indicator impregnated on the granules, which signals chemical exhaustion of the bed) or electronically (by the output of a $CO_2$ detector, for example of the infra-red type, showing $CO_2$ levels above a certain predetermined value, for example, 50 ppm), the bed must be replaced.

There is therefore a need for a scrubber system of special application to serviceable batteries of the above type (e.g., mechanically-rechargeable zinc-air) wherein there is a need to periodically maintain the $CO_2$ scrubber system, and it is desirable, for economical and/or ecological reasons, to reprocess the spent scrubber active material rather than simply disposing of spent scrubber material and using of fresh material.

U.S. Pat. No. 3,909,206 teaches a scrubber using finely-ground alkali hydroxide particles mixed with fine particles of a hydrophobic material, such as polytetrafluoroethylene, for removing carbon dioxide from a gas stream to a concentration of less than 0.25 ppm.

Although $CO_2$ levels may be reduced to less than 0.25 ppm, no means are provided for reprocessing the scrubber material, or for extending the effective life thereof.

U.S. Pat. No. 3,990,912 for hydrogen-air fuel cells with alkaline electrolytes uses electrochemical means to convert $K_2CO_3$ in the cell electrolyte back to KOH, by means of an additional regenerator cell system with circulating electrolyte that consumes hydrogen when it operates. This may be too complex, heavy and parasitic as to power needs for a mobile system application (e.g., an electric vehicle) and, requiring a source of hydrogen, will not be applicable to non-hydrogen systems (e.g., aluminum-air).

U.S. Pat. No. 4,047,894 describes a scrubber element comprised of spaced-apart corrugated layers of porous PVC impregnated with $CO_2$-absorbing solution (e.g., 10 Moles/liter aqueous KOH). Although means for reuse of the element are described (column 3, lines 49–52), comprising rinsing with water, drying and reimpregnation with absorption solution, no means are given for reprocessing of the spent absorber to give fresh absorbent free of carbonate deposits, or for extending the effective life thereof by mechanical means.

In light thereof, there is now provided, according to the present invention, a method for maximizing the effective life and utilization of $CO_2$-absorbent material in a scrubber system for removing carbon dioxide from an air inflow to a metal-air battery or fuel cell, comprising providing in such a battery a housing including a gas inlet, a gas outlet and at least one removable, gas-permeable container containing a $CO_2$-absorbent material, said container being positioned across the flow path of gas entering said inlet and exiting said outlet; wherein, after a predetermined utilization of said system, said at least one removable, gas-permeable container is removed from said system and spent $CO_2$-absorbent material from said container is regenerated for reuse in said scrubber system, said regeneration including at least periodically removing accumulated Group 1a metal carbonate deposits.

In preferred embodiments of the present invention, said $CO_2$-absorbent material comprises granules of a Group 1a metal hydroxide or a hydrate thereof, and wherein regeneration thereof comprises the steps of:

a) removing spent $CO_2$-absorbent material from said container and comminuting said material;

b) thermally decomposing said material;

c) hydrolysing the material from step (b) with water to reform the hydroxide which is obtained in the solid phase, by means of crystallizing out and drying;

d) comminution and granulation of the hydrated material to predetermined particle size and porosity; and e) repacking the regenerated particles in a scrubber container for reuse.

In other preferred embodiments of the present invention, said $CO_2$-absorbent material comprises a solution of Group 1a metal hydroxide in water absorbed into porous granules of an alkali-resistant material, and wherein regeneration thereof comprises immersing the scrubber container in a flowing stream of a Group 1a metal hydroxide-rich solution until all the absorbent carrier granules have picked up fresh Group 1a metal hydroxide solution, and draining the container of excess solution, whereafter said container is ready for reuse.

In these later embodiments, Group 1a metal carbonate accumulates in said regeneration solution after several uses thereof, and thus the present method comprises the further step of slaking said regeneration solution with lime or barium hydroxide to remove accumulated Group 1a metal carbonate deposits therefrom, followed by filtering off insoluble carbonates.

When said Group 1a metal hydroxide is NaOH, the present method may alternatively comprise the further step of chilling the solution to at least −10° C., whereupon sodium carbonate settles out, followed by filtering off said sodium carbonate.

It has now also been found, especially for scrubbers in mobile applications, that at $CO_2$ breakthrough there still remains a substantial amount of granules in the scrubber bed that has hardly reacted, with most of the reaction having occurred in an outer layer through which air enters the bed. If the complete bed is replaced at this stage, poor utilization of the overall scrubber material is realized.

In light thereof, the present invention now also provides a method for maximizing the effective life and utilization of carbon dioxide-absorbent material in a scrubber system for removing carbon dioxide from a metal-air battery or fuel cell, comprising providing, in such a battery, a housing including a gas inlet and a gas outlet, and a plurality of gas-permeable containers supported in series across the flow path of gas entering said inlet and exiting said outlet, each of said containers containing a carbon dioxide-absorbent material and being individually independently removable from said series, wherein, after a predetermined utilization of said system, a first container closest to said gas inlet is removed from said series and a second container from said series is repositioned in the place of said first container, while the material in said first container is regenerated as described herein.

As will now be understood, in this embodiment of the present invention, the scrubber bed is sub-compartmentalized into two or more layers. When breakthrough occurs, only the air-entry layer is removed, with means available (e.g., sliding, rotational, spring, levers, gravitational, hydraulic, pneumatic, manual, motorized, etc.) for repositioning the remaining layer(s) to take the place of a removed layer within the scrubber, and such that a new layer may be introduced into the air-exit side of the scrubber.

In the case of a zinc-air battery, where mechanical refueling of the zinc is required, for example, once per week, the scrubber material would be conveniently subdivided into three equal layers, only one of which is replaced at weekly intervals for reprocessing, and by this means only scrubber material with a high level of chemical conversion (above 80%) need be used.

Thus, in especially preferred embodiments of the present invention, there is provided a method wherein said scrubber is sub-compartmentalized into a series of three separately removable and repositionable gas-permeable containers, wherein, upon removal of a first container, a second container is repositioned in its place, whereafter a third container from said series is repositioned in place of said second container, and a new container, containing fresh carbon dioxide-absorbent material, is positioned in place of said third container.

In another embodiment of the present invention, after partial utilization of the $CO_2$-absorbent material, air feed conduits connected to said inlet and said outlet are manually disconnected by the user and exchange-reconnected thereto, for maximum utilization of the $CO_2$-absorbent material before the regeneration thereof as described herein.

In yet another embodiment of the present invention, there is provided a removable, tubular, gas-permeable container containing a $CO_2$-absorbent material between concentric inner and outer cylindrical walls thereof and creating a flow path from said inner to said outer wall, wherein the area of $CO_2$-absorbent material increases along said flow path.

The scrubber system of the present invention is preferably based on the use of a coarse, granular type $CO_2$-absorbent material (3–30 mesh), comprising an alkali metal hydroxide (e.g., selected from LiOH, NaOH, KOH). The hydroxide may be in the solid phase (either anhydrous or hydrated form), when advantageously a certain minimum porosity (50% minimum) of the granules will ensure good utilization of the inner portions of said granules. Alternatively, especially when the air to the scrubber/ battery is prehumidified, the hydroxide may be in the form of an impregnated phase as an aqueous solution (e.g., 30–40 wt. % MOH) absorbed on porous carrier granules of an alkali-resistant plastic, ceramic or elastomer in foam, flock, chip or felt form. Examples of such materials are polyethylene, polypropylene, PVC, polystyrene, nylon, low-density brick, or rubber.

If an aqueous solution of alkali metal hydroxide is used to impregnate the carrier granules and the carrier is sufficiently porous (at least 50%), the excellent hygroscopic properties of the hydroxide will ensure under humidified air an effective, quasi-liquid phase at the granule surface, enabling adequate use of the sub-surface layers as well for $CO_2$ absorption.

For regeneration of the scrubber material, there are two approaches, depending upon whether the scrubber material is used in the solid phase (preferred for LiOH-based scrubbers), or as a solution phase impregnated on a porous carrier (preferred for NaOH, KOH-based scrubbers). If solid phase, the spent scrubber material (mainly the carbonate $M_2CO_3$), after removal from the scrubber container, may be comminuted and then decomposed thermally to give the metal oxide $M_2O$, usually requiring a high-temperature roast step (900°–1400° C.):

$$M_2CO_3 = M_2O + CO_2 \qquad (3)$$

The product $M_2O$ may be hydrolyzed with water to reform the hydroxide, which is obtained in the solid phase by means of crystallization, drying and comminution, and may then be regranulated to give fresh solid MOH and repacked into the scrubber container.

$$M_2O + H_2O = 2MOH \qquad (4)$$

Instead of using a thermal cycle, the spent $M_2CO_3$ may be slaked with a low-cost reagent, such as lime (CaO) in a wet process to reform MOH, which is then obtained in the solid phase by separation of the precipitated $CaCO_3$ from the aqueous MOH phase using, for example, filtration followed by evaporation/granulation. As an alternative to lime, barium hydrate is applicable.

$$M_2CO_3 + CaO + H_2O = 2MOH + CaCO_3 \qquad (5)$$

$$M_2CO_3 + Ba(OH)_2 = 2MOH + BaCO_3 \qquad (6)$$
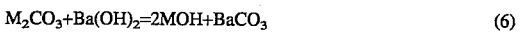

The reactions (4), (5) are exothermic and the heat evolved may be usefully employed elsewhere. Additionally, the $CO_2$ product from (3) or the $CaCO_3/BaCO_3$ (precipitated) product from (5) or (6) are recoverable for resale or reprocessing back to $CaO$ or $Ba(OH)_2$, while a chemical indicator for showing $CO_2$ saturation may be added at the final granulation stage.

If the scrubber material is impregnated as a solution on a porous granular carrier, the element containing spent material is left soaking in a flowing excess closed cycle wash stream of low carbonate-MOH solution until the carbonate content in the granules has reached an acceptably low level, and after draining the element may be reused. The wash stream containing both MOH and rejected $M_2CO_3$ is continuously or batch purified by either physical means (only for $NaOH/Na_2CO_3$) by cooling to $-10°$ C. (when $Na_2CO_3$ separates out by crystallization), or by chemical means (slaking with lime or barium hydrate as in Equation (5) or Equation (6) above).

The invention will be described in connection with certain preferred embodiments, with reference to the following illustrative figures so that it may be more fully understood.

With reference to the figures, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DESCRIPTION OF THE PREFERRED EMBODIMENTS

Figure 1:
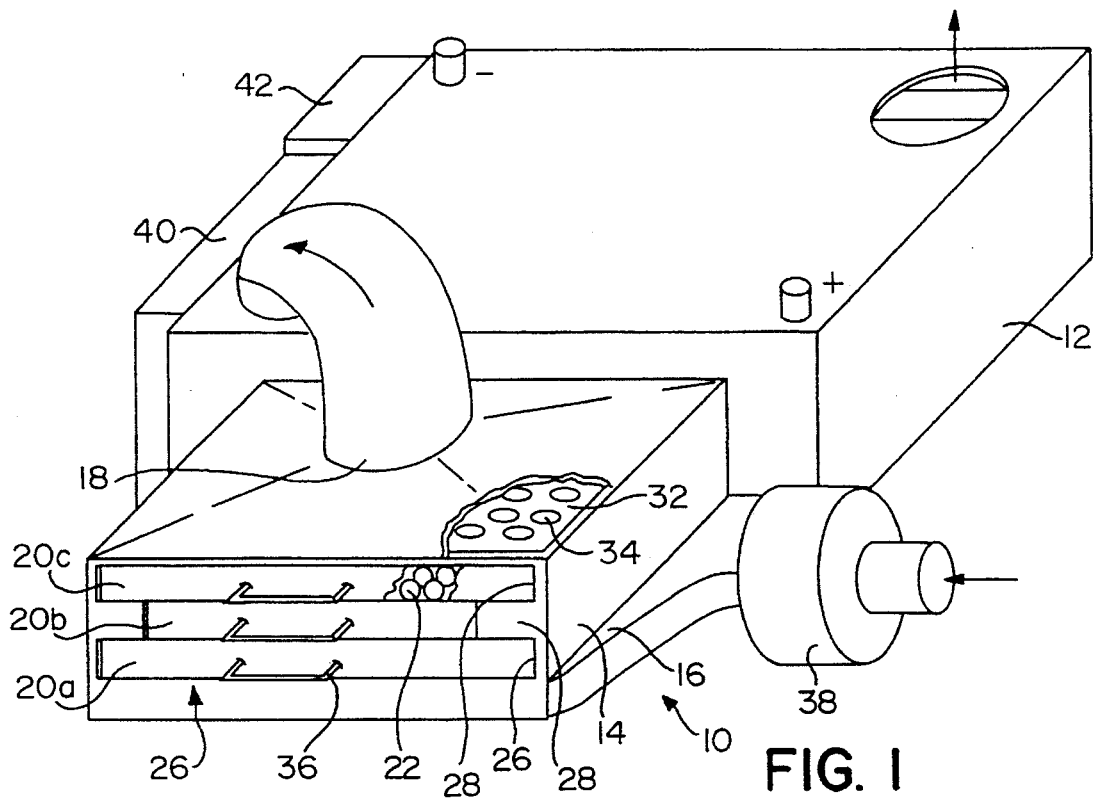
FIG. 1 is a perspective view of a preferred embodiment of the scrubber system according to the invention.

Referring now to the drawings, there is seen in FIG. 1 a scrubber system 10 for removing carbon dioxide from a metal-air battery, such as the zinc-air battery 12 shown. This is achieved by removing said carbon dioxide from the air which is fed to the battery 12 for use as an oxidant.

A scrubber housing 14 is provided with a gas inlet 16, through which air enters, containing, as is normal, about 0.04% of $CO_2$. Housing 14 is also provided with a gas outlet 18, through which purified air passes on its way to be used in the battery 12.

In FIG. 1, three gas-permeable containers 20a, 20b, 20c are supported in series across the flow path of gas, i.e., air, which enters inlet 16, passes in series through all the containers 20, and exits the scubber housing 14 through the outlet 18. Each of the containers 20 holds a $CO_2$-absorbent material 22. Preferably, the $CO_2$-absorbent material comprises granular alkali metal hydroxide. A granule size of between 1 and 2 millimeters diameter provides a suitable compromise between the conflicting requirements of providing a large surface area and of minimizing the pressure drop of the gas flow.

In a further embodiment, the $CO_2$-absorbent material 22 comprises aqueous alkali metal hydroxide absorbed on a porous carrier.

The containers 20 are individually independently removable from said series, so that a container holding material 22 which is chemically exhausted may be removed and replaced by a fresh container. Advantageously, the arrangement allows the individual removal from said series of a first container 20a closest to the gas inlet 16, and the repositioning of a second container from said series in the place of the container 20a. As the first container 20a processes air which still retains its full charge of $CO_2$, it is this first container 20a which will first be chemically exhausted. The air entering the container 20b will already have had a substantial part of its original $CO_2$ content removed, and thus container 20b will therefore be able to continue functioning after exhaustion of container 20a. The third container 20c can be repositioned in place of the second container 20b, upon repositioning of the second container 20b in place of the first container 20a, and a new container positioned in place of the third container 20c.

In FIG. 1 there is also shown housing 14 wherein three containers 20 are arranged as a vertical stack 26. Each lower container 20a, 20b directly supports an upper container. In the vertical stack 26, a sufficient degree of air sealing between vertically-adjacent containers is achieved by using the weight of the full upper container 20c as a sealing force.

Housing 14 is provided with a lower side opening 26 to allow removal of the lowest container 20a. An upper side opening 28 allows insertion of an upper container 20c. Restricter means 28 are provided for the retention in framework 24 of the intermediate container 20b.

Container 20 is provided with two major opposite faces 32, which are air porous. A large number of apertures 34 are provided on each face 32, the apertures 34 being smaller than the size of the granules comprising the material 22. Handles 36 are provided for convenience of withdrawal of the containers 20 from framework 24.

In operation, a blower 38, powered by the battery 12, takes in air from the atmosphere and forces this air through the scrubber system 10, where $CO_2$ is removed. The purified air is then distributed to the cathodes of the individual battery cells and exits from the battery 12.

The battery is further provided with an air humidification unit 40 and a thermal management controller 42.

Figure 2:
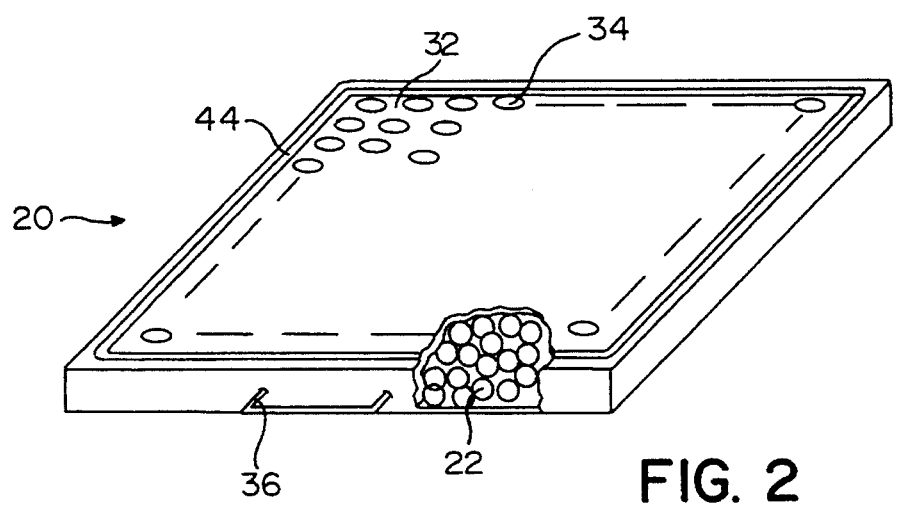
FIG. 2 is a perspective view of an embodiment of a container therefor.

Referring now to FIG. 2, there is seen a container 20, as described above, further comprising an attached seal element 44, configured for reducing air leakage between adjoining containers. The seal element 44 is advantageously made of a low-friction elastomer, so that withdrawal of a container may be effected without excessive seal frictional resistance.

Figure 3:
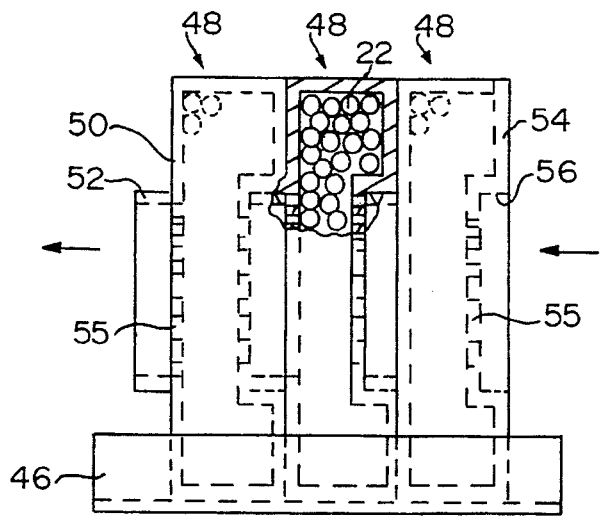
FIG. 3 is a perspective view of a further embodiment of the scrubber.

FIG. 3 shows a rack 46, supporting a series of containers 48 in contacting horizontal formation. Each container is provided, on a first side 50, with a male connector element 52, and on an opposite second side 54, with a corresponding female connector element 56. The sides 50, 54 have screens 55, sufficiently fine to retain $CO_2$-absorbent material 22. As shown, in connected formation the containers 48 form a substantially gas-tight series.

The advantage of the horizontal series lies in that the containers 48 are easier to disconnect for purposes of replacement, as the series can be broken at any location by sliding the containers 48 along the rack 46.

Figure 4:
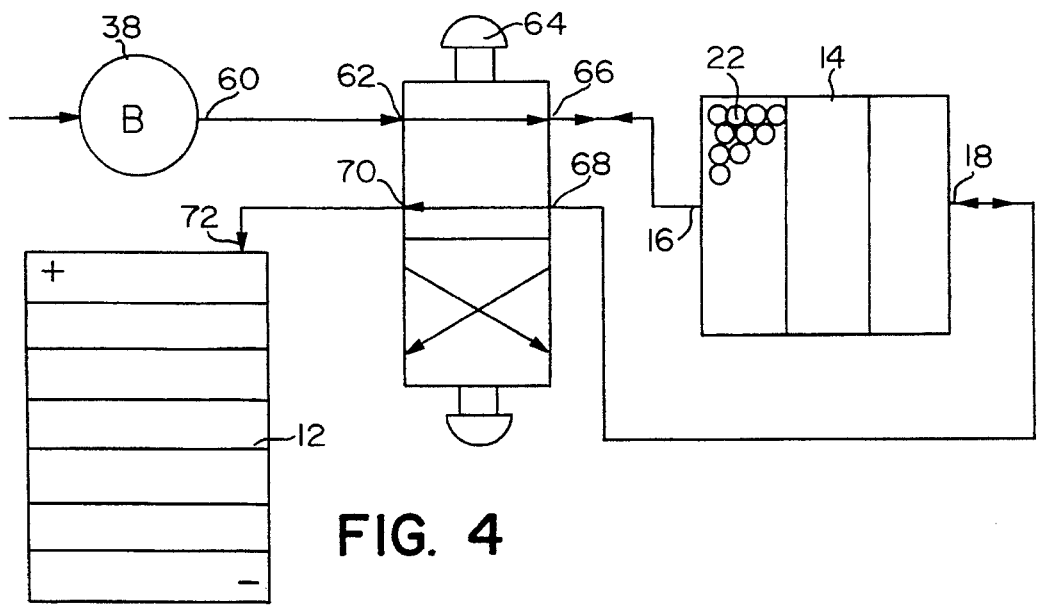
FIG. 4 is a diagram of a scrubber system provided with air flow reversal means.

FIG. 4 depicts a further embodiment of a scrubber system 58. An air blower 38, having an outlet port 60, is connected to one port 62 of a four-way air valve 64. The remaining three ports 66, 68, 70 of the valve 64 are respectively in fluid connection with both gas ports 16, 18 of the scrubber housing 14, and with the air inlet port 72 of the metal-air battery 12.

In operation of this embodiment, the scrubber is used until its output contains an unacceptably high level of $CO_2$, for example, 0.03%, resulting from chemical exhaustion of granules 22 near the scrubber air inlet 16. The valve 64 is then operated, either by hand or by means of an automatic control, and the flow of air through the scrubber is thereby reversed. Due to air flow reversal, the granules which were previously adjacent to the scrubber outlet 18 and are therefore still chemically active, are now adjacent to the air inlet and now act to absorb $CO_2$. Consequently, the operating life of the scrubber system is extended by a factor of about 1.8.

Figure 5:
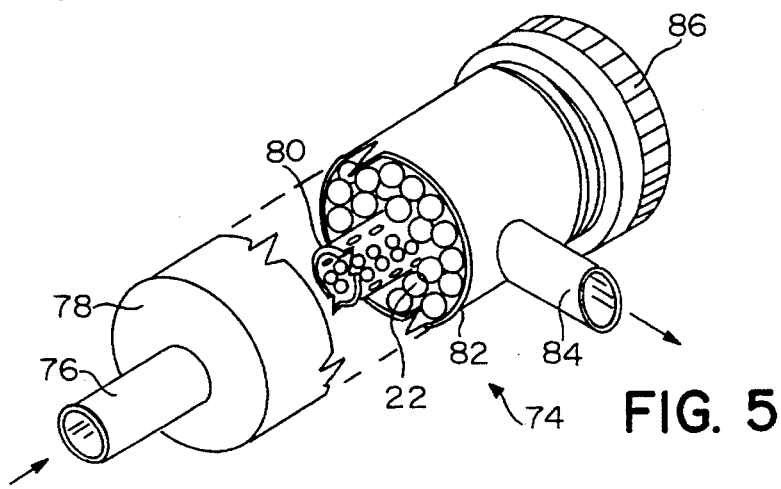
FIG. 5 is a perspective, fragmented view of a cylindrical embodiment of the scrubber.

Referring now to FIG. 5, there is seen a scrubber in the form of a removable tubular container 74. An air inlet 76 is connected through an end face 78 to an inner perforated tube 80, which is concentric to the outer cylindrical wall 82. $CO_2$-absorbent material 22, allowing passage of air, is contained in the space between the inner and outer walls. An outlet 84 for purified air is connected to the outer wall 82. As is apparent from the geometry of the container 74, an air flow path is created from the inner to the outer wall, along which path the area of $CO_2$-absorbent material increases. A removable sealing cap 86 is provided at one end of the container 74. Removal of the cap 86 allows emptying of container 74 of exhausted material 22 and refilling thereof with fresh material 22. Exhausted material 22 in small quantities is discarded; large quantities are, for economic and environmental reasons, chemically recharged for reuse.

The invention also provides a method for maximizing the effective life and utilization of $CO_2$-absorbent material in a scrubber system for removing carbon dioxide from a metal-air battery or fuel cell, comprising:

Step A: providing, in a metal-air battery, a housing including a gas inlet and a gas outlet, and a plurality of gas-permeable containers supported in series across the flow path of gas entering said inlet and exiting said outlet, each of said containers holding a $CO_2$-absorbent material and being independently removable from said series;

Step B: removing from said series, after a predetermined amount of use of said system, a first container closest to said gas inlet, and repositioning a second container in the place of the first container.

A further embodiment of the method comprises:

Step A: providing, in a metal-air battery, a sub-compartmentalized system wherein there are three separately removable and repositionable, gas-permeable containers;

Step B: removing from said series, after a predetermined amount of use of said system, a first container closest to said gas inlet, and repositioning a second container in the place of the first container;

Step C: repositioning a third container from said series in the place of said second container;

Step D: positioning a new container, holding fresh $CO_2$-absorbent material, in the place of said third container.

In a preferred embodiment of the invention, an additional step is added:

Step E: Regenerating and repacking spent $CO_2$-absorbent material from said first container, for reuse in said scrubber system.

Regeneration of the material has ecological advantages and, where large quantities of containers are collected, will also be of economic advantage.

In a further preferred embodiment of the invention, an additional step is inserted between Step A and Step B:

Step A-1: After partial utilization of the $CO_2$-absorbent material, air feed conduits connected to said inlet and said outlet are manually disconnected by the user and are then exchange-reconnected thereto.

As explained above, the consequent reversal of the air flow will improve utilization of the overall $CO_2$-absorbent scrubber material.

It will be evident to those skilled in the art that the invention is not limited to the details of the foregoing illustrated embodiments, and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method for maximizing the effective life and utilization of $CO_2$-absorbent material in a scrubber system for removing carbon dioxide from an air inflow to a metal-air battery or fuel cell, the method comprising the steps of:

providing, in such a battery, a housing including a gas inlet, a gas outlet, and a plurality of gas-permeable containers supported in series across the flow path of gas entering said inlet and exiting said outlet;

each of said containers containing a $CO_2$-absorbent material and being individually independently removable from said series; and flowing gas containing $CO_2$ into said gas inlet, through said $CO_2$-absorbent material in each of said plurality of containers, and out of said outlet, wherein, after a utilization of the system, a first container closest to said gas inlet is removed from said series and a second container from said series is repositioned in the place of said first container and spent $CO_2$-absorbent material from said first container is regenerated for reuse in said scrubber system, said regeneration including at least periodically removing accumulated Group 1a metal carbonate deposits.

2. A method according to claim 1, wherein said $CO_2$-absorbent material comprises granules of a Group 1a metal hydroxide or a hydrate thereof, and wherein regeneration thereof comprises the steps of:

a) removing spent $CO_2$-absorbent material from said container and comminuting said material;

b) thermally decomposing said material;

c) hydrolyzing the material from step (b) with water to reform the hydroxide, which is obtained in the solid phase by means of crystallizing out and drying;

d) comminution and granulation of the material from step (c) to a particle size and porosity; and e) repacking the regenerated particles in a scrubber container for reuse.

3. A method according to claim 2, wherein said regenerated material is comminuted and granulated to granules of 3–30 mesh size, and packed with a porosity of at least 50%.

4. A method according to claim 1, wherein said $CO_2$-absorbent material comprises a solution of Group 1a metal hydroxide in water absorbed into porous granules of an alkali-resistant material, and wherein regeneration thereof comprises:

immersing the scrubber container in a flowing stream of a Group 1a metal hydroxide-rich solution until all the absorbent carrier granules have picked up fresh Group 1a metal hydroxide solution, and draining the container of excess solution, whereafter said container is ready for reuse.

5. A method according to claim 4, wherein said granules have absorbed therein a solution having a solution strength of about 20–45 weight % Group 1a metal hydroxide, and have a porosity of at least 50%.

6. A method according to claim 4, wherein said immersion is carried out in a closed system.

7. A method according to claim 4, wherein said carrier material is selected from the group consisting of granules of polyethylene, polypropylene, polyvinylchloride, polystyrene, nylon, low-density brick, and rubber.

8. A method according to claim 4, comprising the further step of slaking said regeneration solution with lime or barium hydroxide to remove accumulated Group 1a metal carbonate deposits therefrom, followed by filtering off insoluble carbonates.

9. A method according to claim 4, wherein said Group 1a metal hydroxide is NaOH, and comprising the further step of chilling the solution to at least −10° C., whereupon sodium carbonate settles out, followed by filtering off said sodium carbonate.

10. A method according to claim 4, wherein said system is sub-compartmentalized into three separately removable and repositionable gas-permeable containers;

wherein, upon removal of said first container, said second container is repositioned in its place, whereafter a third container from said series is repositioned in place of said second container, and a new container, containing fresh $CO_2$-absorbent material, is positioned in place of said third container.

11. A method according to claim 1, wherein said system is sub-compartmentalized into three separately removable and repositionable, gas-permeable containers;

wherein, upon removal of said first container, said second container is repositioned in its place, whereafter a third container from said series is repositioned in place of said second container, and a new container, containing fresh $CO_2$-absorbent material, is positioned in place of said third container.

\* \* \* \* \*